United States Patent [19]
Kim et al.

[11] Patent Number: 5,786,860
[45] Date of Patent: Jul. 28, 1998

[54] HIGH SPEED BLOCK MATCHING FOR BI-DIRECTIONAL MOTION VECTOR ESTIMATION

[75] Inventors: Min-Kyu Kim, Inchon; Jae-Kyoon Kim, Seoul, both of Rep. of Korea

[73] Assignee: Korean Advanced Institute of Science and Technology, Taejon, Rep. of Korea

[21] Appl. No.: 392,344

[22] Filed: Feb. 22, 1995

[30] Foreign Application Priority Data

Jul. 30, 1994 [KR] Rep. of Korea ............... 1994 18902

[51] Int. Cl.$^6$ .................................................. H04N 7/36
[52] U.S. Cl. ............................................. 348/416; 348/699
[58] Field of Search .................................... 348/699, 401, 348/402, 409, 412, 413, 415, 416, 419

[56] References Cited

U.S. PATENT DOCUMENTS

5,473,379  12/1995  Horne .................................. 348/416

*Primary Examiner*—Amelia Au
*Attorney, Agent, or Firm*—IP Group of Pillsbury Madison & Sutro LLP

[57] ABSTRACT

A high speed block matching algorithm for a bi-directional motion vector estimation, capable of improving the accuracy and the amount of computation in the bi-directional motion vector estimation by using a uniform motion model for displacement and spatial correlation of motion vectors in a bi-directional motion estimated prediction structure adaptively using pictures forwardly predicted from a past reference picture and pictures bi-directionally predicted from two, past and future reference.

6 Claims, 4 Drawing Sheets

$R(k) = \{ (dx, dy) / -p < dx, dy < p \}$, for all $k$

Fig. 6

63, CANDIDATE VECTORS NEIGHBORING TO ONE ANOTHER
IN DIRECTION OF SPACE OF $V_c = \{V_1, V_2, V_3\}$

Fig. 7

HIGH SPEED BLOCK MATCHING FOR BI-DIRECTIONAL MOTION VECTOR ESTIMATION

BACKGROUND OF THE INVENTION

1. Field of the Invention

The present invention relates to a block matching process, and more particularly to a high speed block matching process capable of more effectively estimating bi-directional motion vectors with less computation in a motion compensated prediction coding technique adaptively using pictures, one-directional prediction pictures and bi-directional prediction pictures as in a standard scheme proposed by Moving Picture Experts Group (MPEG) for a moving picture compression.

2. Description of the Prior Art

Figure 1:
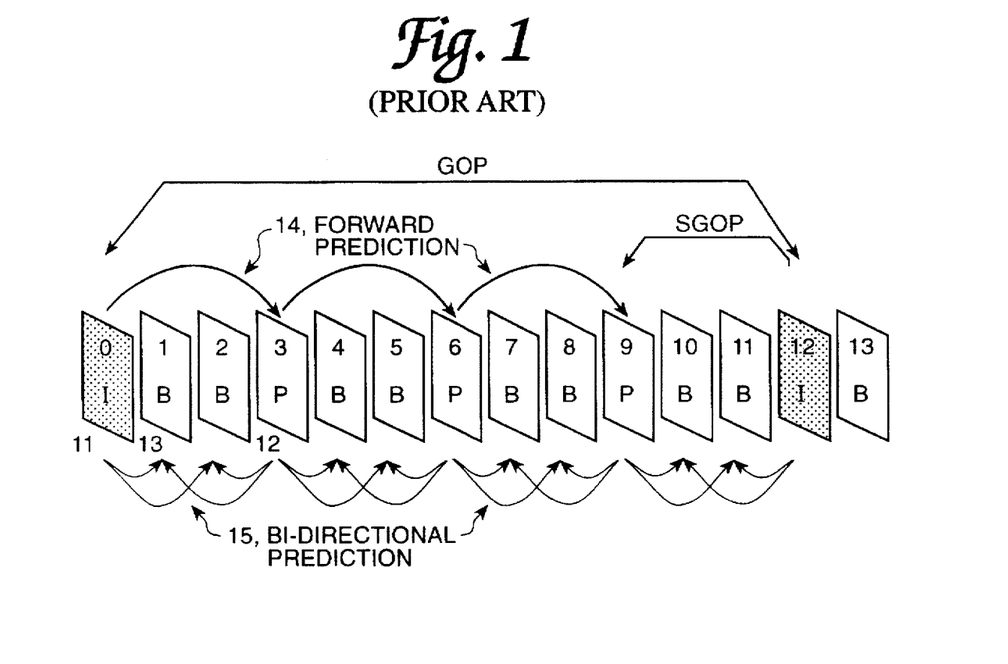
FIG. 1 is a schematic view illustrating the structure of GOP of MPEG (N=12 and M=3)

A representative technique for compressing moving pictures is a combined motion compensated prediction (MCP) /discrete cosine transform (DCT) coding technique capable of reducing time redundancy by motion compensation prediction and reducing space redundancy by the DCT. The ISO-IEC/MPEG which is an international standardization organization has established a standard scheme relating to moving picture compression techniques applicable to communication and broadcast fields as well as digital storage media. This standard scheme also utilizes the MCP/DCT combined coding technique. In accordance with the standard MPEG-video technique (hereinafter, referred to as MPEG technique), three kinds of pictures, namely, intra (I)-picture, one-directional prediction (P)-picture and bi-directional (B)-picture are defined due to conflicting requirements for high bit rate compression and random access. These I-, B- and P-pictures are periodically used in the input order thereof. A group of I-, B- and P-pictures present between two successive I-pictures is called "a group of pictures (GOP)". Such a GOP serves as the unit of random access. FIG. 1 illustrates a GOP structure in a case of N=12 and M=3. Here, "N" represents the number of pictures present in the GOP whereas "M" represents the picture space between two successive P-pictures. In other words, M-1 B-pictures are used between two successive P-pictures. I-pictures are coded only using original picture data requiring no motion compensation.

Therefore, such I-pictures serve as access points respectively enabling the random access to encoded bit strings because they are not affected by other pictures. Accordingly, it is possible to prevent any error propagation to subsequent pictures of a coding error generated in the process of coding is propagated to subsequent pictures. Each P-picture is coded after a motion compensation (MC) made by a causal estimation from a past I-picture or a past P-picture. On the other hand, coding of each B-picture is made after a motion compensation made by a non-causal estimation from a past or future I-picture or a past or future P-picture.

Assuming that a group of pictures $I_0B_1B_2 \ldots B_{M-1}P_M$ present between successive P(I)-picture and P-picture in the GOP structure of FIG. 1 is defined as a sub-group of pictures (SGOP), motion compensation relations of the SGOP to B- and P-pictures can be expressed as in the following Table 1 and FIG. 2.

TABLE 1

(MC relations of the SGOP to B- and P-pictures)

| Picture | MCP Mode | Equation |
|---------|----------|----------|
| $P_M$ | Forward | $I(z, M) = I(z + v_f O, M), O)$ |
| $B_k$ | Forward | $I(z, k) = I(z + v_f (O, k), O)$ |
|  | Backward | $I(z, k) = I(z + v_f (M, k), M)$ |
|  | Bi-directional | $I(z, k) = (I(z + v_f (M, k), M) + I(z + v_f (O, k), O))/2$ |

As shown in Table 1, P-pictures are subjected only to forward motion compensation prediction whereas B-pictures are subjected to three kinds of motion compensation predictions, namely, forward motion compensation predictions, backward motion compenstion prediction, future P-pictures (or I-pictures) and bi-directional motion compensation prediction from past and future P-pictures (or I-pictures). Here, bi-directional motion compensation predictions means MCP by motion compensated interpolation (MCI). For each block of a B-picture, an estimation error is derived by three kinds of motion compensation predictions. Of the motion compensation predictions the one generating the minimum sum of square errors (SSE) is determined as the final motion compensation prediction mode for the block.

Figure 3:
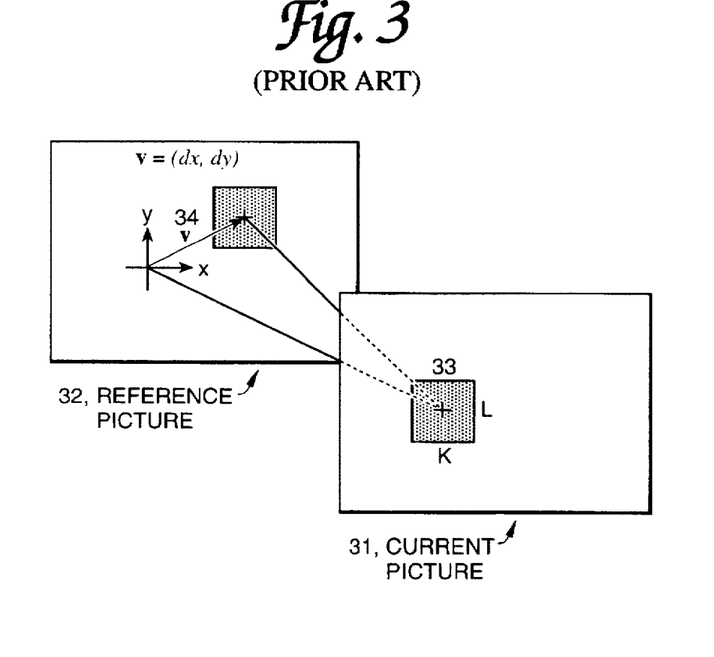
FIG. 3 is a schematic view illustrating a procedure of estimating a motion vector in accordance with the block matching algorithm.

In accordance with MPEG, motion vectors are estimated in units of a 16×16 block size called a "macroblock (MB)". The block matching algorithm (BMA) which is one of algorithms for estimating motion vectors by units of blocks satisfies substantially conflicting requirements such as estimation efficiency, accuracy, computational complexity and data amount for expressing motion vectors. In particular, this block matching algorithm is widely used because it is easily realized in block coding techniques such as a combined MCP/DCT coding technique. In accordance with the block matching algorithm a current picture 31 to be motion-estimated is divided into blocks of a predetermined size, as shown in FIG. 3. Each block 33 is compared with candidate blocks present in a search area of a reference picture 32 in accordance with given matching criteria to find the position of the best matching block. Based on the found position of the best matching block, 2-D motion vectors V of each block are estimated. Where B-pictures enabling bi-directional prediction from the past and future reference pictures are adaptively used as in the MPEG, however, the prediction efficiency and the accuracy in estimation are degraded because the space between successive pictures to be estimated for motion vectors is increased depending on the number of B-pictures used. Furthermore, the computation amount of the block matching algorithm is also abruptly increased. This results in difficulty realizing the block matching algorithm in real time. Since the MPEG technique, in particular, the MPEG-2 technique is used for a variety of pictures involving large motion, such a high speed algorithm encounters a degradation in performance.

A representative one of existing algorithms for estimating bi-directional motion vectors in accordance with the MPEG technique and its problems will now be described.

Existing Motion Vector Estimation Algorithms

(1) Full Search Algorithm (FSA)

In order to limit the maximum computation amount in the block matching algorithm, estimation of motion vectors are achieved within a predetermined maximum displacement.

The full search algorithm which is adapted to estimate motion vectors by comparing all blocks present in a given search area with one another requires an excessively large amount of computation even though a best performance is obtained in terms of estimated gain. For example, assuming that the maximum displacement per picture for blocks of a K×L size is ±p pels/frame, the size of the search area in a reference picture corresponds to $(K+2p)\times(2p+1)^2$. This means that where p is large, real time realization is difficult because the number of candidate blocks to be compared on the basis of the matching reference corresponds to $(2p+1)^2$. In particular, where the space between pictures to be estimated is increased as in MPEG, the real time realization is difficult because the amount of computation is increased in proportion to the square of the space and because the bi-directional motion vector should be estimated. Where the picture space is k, the group R(k) of candidate vectors is expressed by the following equation:

$$R(k)=\{l(dx,dy)|-k\cdot p \leq dx, dy \leq k\cdot p\} \quad (1)$$

Therefore, the number of matching blocks corresponding to the computational complexity is expressed by the following equation (2):

$$\begin{aligned} C_k &= (2\cdot k \cdot p + 1)^2 \\ &\approx k^2 \cdot 4p^2 \\ &= k^2 \cdot C_0 \end{aligned} \quad (2)$$

where, $C_0$ represents the number of matching blocks in the case of k=1 and corresponds to $C_0=(2p+1)^2$.

When the picture space is increased k times, the amount of computation is increased $k^2$ times.

Figure 4:
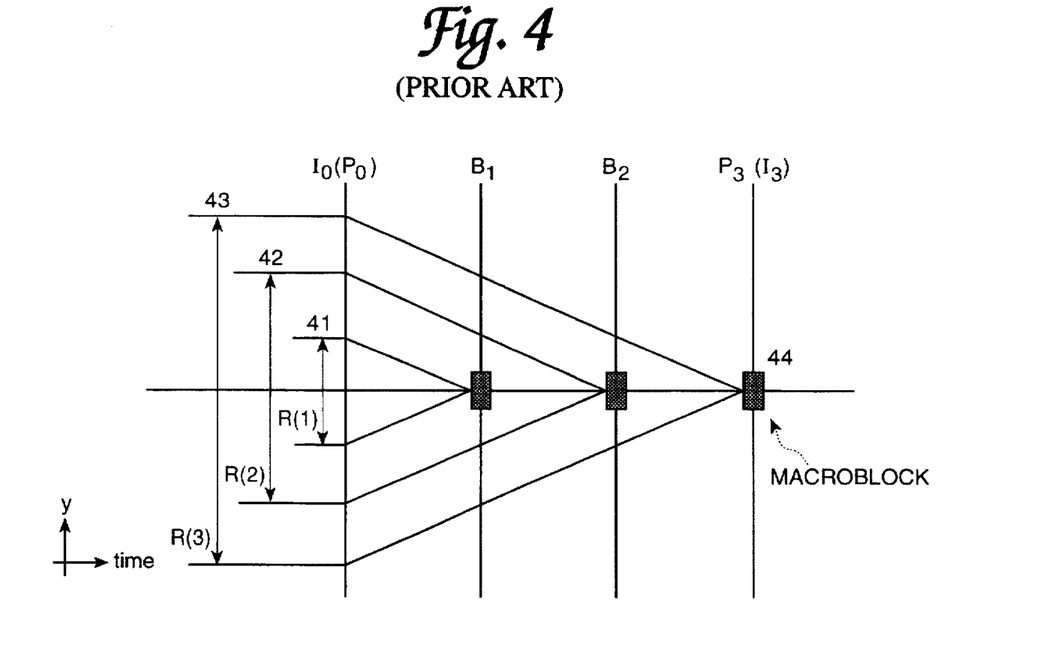
FIG. 4 is a schematic view illustrating a search area for the full search algorithm.

FIG. 4 shows a search area in accordance with the full search algorithm for the forward motion vector estimation (FME) of each picture in an SGOP. For the backward motion vector estimation (BME), a search area similar to that for the forward motion vector estimation is used. Where the space between P-pictures in the SGOP is M, the total computational complexity C for each block can be expressed by the following equation (3):

$$C = C_0 \cdot \left\{ M^2 + \sum_{k=1}^{M-1}[k^2+(M-k)^2] \right\} \quad (3)$$

where, $M^2$ is associated with the forward motion vector estimation of each P-picture while $k^2$ and $(M-k)^2$ are associated with the forward motion vector estimation and backward motion vector estimation of each B-picture, respectively. In the case of M=3, the mean computational complexity for each picture is about 6.3 times that in the case of M=1. In the worst case, P-pictures have the computational complexity of 9 times.

(2) Telescopic Search Algorithm (TSA)

Figure 5:
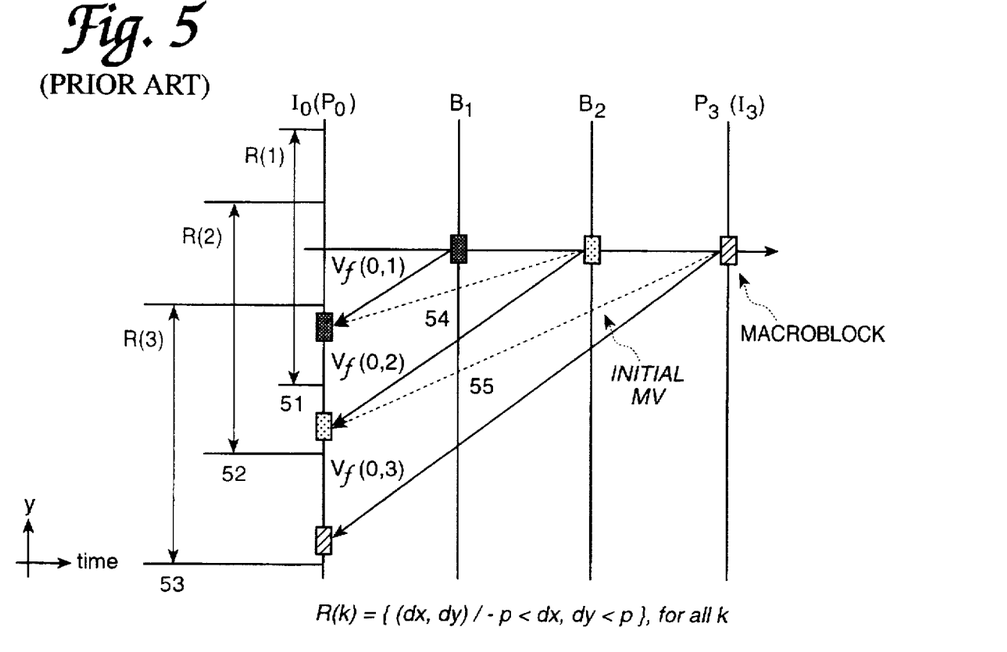
FIG. 5 is a schematic view illustrating the forward motion vector estimation in accordance with the telescopic search algorithm.

Successive pictures have a very high correlation therebetween in terms of the displacement of a moving object. The telescopic search algorithm is an algorithm for reducing the search area by use of such an correlation. FIG. 5 shows a forward motion vector estimation procedure carried out in the following order:

Step 1: Between a reference picture $P_0$ and a current picture $B_1$, a motion vector $v_f(0,1)$ of a macroblock of the picture $B_1$ is estimated;

Step 2: Between the reference picture $P_0$ and a picture $B_2$, a motion vector $v_f(0,2)$ of an MB of the picture $B_2$ is estimated under a condition that the value of $v_f(0,1)$ is used as an initial value. In this case, the size of the search area used is the same as in the case of Step 1; and Step 3: Between the reference picture $P_0$ and a picture $P_3$, a motion vector $v_f(0,3)$ of a macroblock of the picture $P_3$ is estimated under a condition that the value of $v_f(0,2)$ is used as an initial value.

In accordance with the telescopic search algorithm, motion vectors estimated at the above steps are used as motion vectors of corresponding pictures, respectively. Backward motion vectors are estimated in a manner similar to that described above. Accordingly, the total computational complexity C of the SGOP can be expressed by the following equation (4):

$$C=C_0\cdot\{2\cdot(M-1)+1\} \quad (4)$$

where, the first term of the equation (4) is associated with $B_1, B_2, \ldots B_{M-1}$ while the second term of the equation (4) is associated with $P_M$. In the case of M=3, the mean computational complexity for each picture is about 1.7 times that in the case of M=1. Similar to the telescopic search algorithm, this method has a computational complexity of M times in the worst case because of the backward motion vector estimation for B-pictures. Since the telescopic search algorithm utilizes the full search algorithm for the search area corresponding to the picture space of K=1 at each estimation step thereof, it falls under the category of the full search algorithm and requires a large amount of computation. In particular, in the case of MPEG-2 technique, it is difficult to realize real time estimation because the maximum motion amount p is estimated in a large area of not less than 14 pels/frame in the case of MPEG-2 technique and because both each field motion vector and each frame motion vector should be estimated for each macroblock. On the other hand, a misalignment converging in local minimum directions around an inaccurate initial motion vector estimated in a previous step may be generated where the moving object involves a large motion or where the motion trajectory tracking estimation of the moving object at an edge of each MB is difficult.

Therefore, it is required to provide a high-speed algorithm capable of obtaining an estimation efficiency compared to those of the full search algorithm and the TSA and yet realizing a real time estimation.

SUMMARY OF THE INVENTION

Therefore, an object of the present invention is to provide a high-speed block matching algorithm capable of achieving a bi-directional motion vector estimation and thereby obtaining a high estimation efficiency and realizing real time estimation.

In accordance with the present invention, this object can be accomplished by providing a high-speed block matching algorithm for a bi-directional motion vector estimation, using a uniform motion model expressed by the following equation (A) as a velocity constrained equation for a displacement to predetermine an initial motion vector in a direction of time:

$$d(p,n)=L(n-p) \quad (A)$$

where, "d(p, n)" represents a displacement vector between a p-th picture and a n-th picture while "L" represents a uniform motion vector between successive pictures.

BRIEF DESCRIPTION OF THE DRAWINGS

Other objects and aspects of the invention will become apparent from the following description of embodiments with reference to the accompanying drawings in which.

DETAILED DESCRIPTION OF THE PREFERRED EMBODIMENTS

If prior information about the motion direction of a block is known, it is possible to reduce more efficiently the search area to be estimated. The "prior information about the motion direction of the block" means the predetermination of an initial value of a motion vector of the block to be estimated. As the initial motion vector is predetermined to be more approximate to an actual motion, the amount of computation for search area, namely, the amount of computation for estimation can be more effectively reduced. Generally, an initial motion vector predetermination method using a spatial correlation among previously estimated motion vectors is widely used. The present invention provides a high-speed block matching algorithm utilizing such characteristics and suitable for a GOP structure including I-, B- and P-pictures involving a bi-directional motion vector estimation as in the MPEG and an irregular space between pictures as objects of the motion vector estimation. The algorithm in accordance with the present invention achieves forward and backward motion vectors for B- and P-pictures through the following three steps:

Initial Motion Vector Estimation
An initial motion vector is estimated from motion vectors of other pictures previously estimated or causal motion vectors of a current picture;

Search Area Selection
A search area is determined depending on an accuracy of the estimated initial motion vector; and Additional Motion Vector Estimation (Motion Vector Refinement)
A final motion vector is estimated in a small search area around the initial vector selected at the above two steps.

The above steps of the algorithm in accordance with the present invention will now be described in detail.

Figure 6:
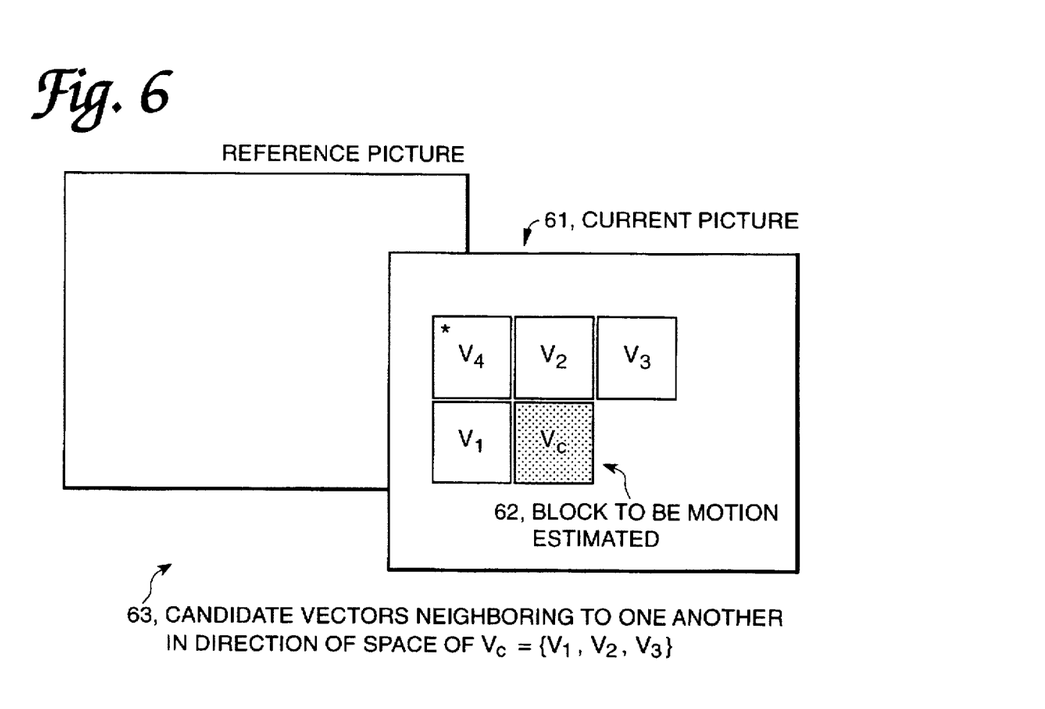
FIG. 6 is a schematic view illustrating candidate vectors neighboring to one another in a spatial area.

(1) Initial Motion Vector Estimation

Where the size of blocks is sufficiently small, a moving object involving a motion can be divided into a plurality of blocks. In this case, motion vectors of neighboring blocks in a picture have a very high spatial correlation. Accordingly, a motion vector of a current block can be estimated from motion vectors of causal blocks previously estimated, as shown in FIG. 6. In the case of the motion vector $v_4$ positioned in the diagonal direction of $-45°$ from the current block approximates to motion vectors $v_1$ and $v_2$ of horizontal and vertical directions. In accordance with the proposed algorithm, accordingly, the following three candidate vectors are used as the initial motion vector for the current block in a spatial region:

$$R_s \leftarrow \{v_1, v_2, v_3\} \tag{5}$$

Meanwhile, since a moving object involves a continued motion in a sequence of pictures, motion vectors of blocks neighboring one another in the direction of time also have a very high temporal correlation. Therefore, motion vectors estimated for a just past picture can be used as the initial motion vector of the current block. In the case of M=1, that is, for the GOP structure, such as "IPPP . . . " using no B-picture, motion vectors of the past picture can be set as the initial motion vector for the motion vector estimation of the current picture in the following manner because the space between pictures to be estimated is always 1 and only forward motion vector estimation is carried out:

For Uniform Motion $$v_f(k-1, k) = v_f(k-2, k-1) \tag{6}$$

For Accelerated Motion $$v_f(k-1, k) = 2 \cdot v_f(k-2, k-1) - v_f(k-3, k-2) \tag{7}$$

where, $v_f(m, n)$ represents a forward motion vector of each block of the n-th picture estimated from the m-th picture.

Figure 2:
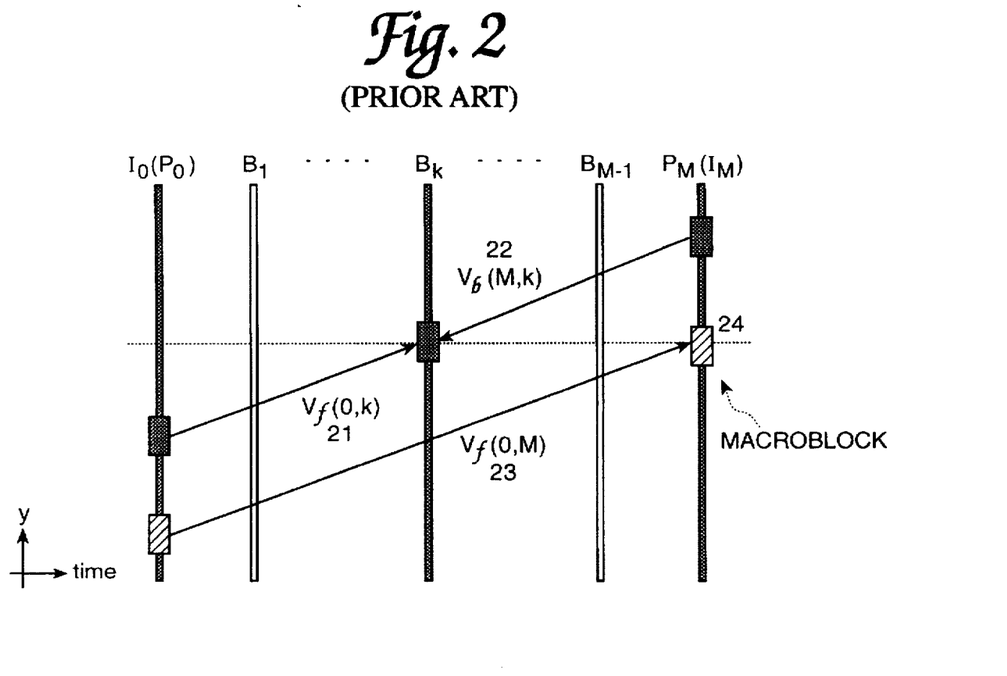
FIG. 2 is a schematic view illustrating estimation and compensation of a motion vector for B/P pictures.

In the case of M>1 as shown in FIG. 2, that is, where at least one B-picture is used, however, the initial motion vector predetermination algorithm expressed by the equation (6) or (7) is improper because the backward motion vector estimation should be used and because the space between the current picture and the reference picture is irregular.

In accordance with the algorithm of the present invention, therefore, an initial motion vector in the direction of time suitable for the MPEG is predetermined using a velocity constrained equation for a displacement involved in the sequence of pictures. For a picture involving a uniform motion and an accelerated motions the displacement vector can be expressed by the following displacement model:

$$d(p,n) = A(n-p^2) + L(n-p) \tag{8}$$

where, d(p, n) represents the displacement vector between the p-th picture and the n-th picture while A and L represent an accelerated motion vector and a uniform motion vector between successive pictures, respectively. Where the space between two successive picture is small, the displacement vector can be limited to the following uniform motion model:

$$d(p,n) = L(n-p) \tag{9}$$

When the above equation (9) is applied to the SGOP structure of the MPEG, the following equations can be derived:

$$v_f(0, k) = k \cdot v_f(0, 1) \tag{10}$$

$$v_f(0, M) = \frac{M}{k} \cdot v_f(0, k) \tag{11}$$

$$V_b(M, k) = -\frac{M-k}{k} \cdot v_f(0, 1) \tag{12}$$

where, $v_f(0, k)$ represents the forward motion vector of the k-th picture while $v_b(M, k)$ represents the backward motion vector of the k-th picture.

Using motion vectors of other pictures previously estimated from the above equations, the initial motion vector of the current block can be predetermined as follows:

1) Forward Motion Vector (FMV)

Since the forward motion vector is derived by a causal estimation, a motion estimation can be immediately carried out in the order of input pictures. Accordingly, the initial motion vector is always predetermined from motion vectors of past pictures.

In Case of K=1

Since the current picture is the first picture of the current SGOP, motion vectors estimated in the just past SGOP are used as follows:

$$v_f(0,1) = \{-v'_b(M, M-1), 1/(M-1) \cdot v'_f(0, M-1), v'_f(0,1)\} \quad (13)$$

where, $v'_f$ and $v'_b$ represent forward and backward motion vectors of the past SGOP, respectively.

Although $v'_f(0, M)$ is the candidate vector most approximate to $V_f(0, 1)$ in the past SGOP, this vector can not be set as the initial vector because there is no $v'_f(0, M)$ where the first picture of the current SGOP is an I-picture.

In Case of $2 \leq k \leq M$

Since the current SGOP includes one or more pictures already completing the motion vector estimation, forward motion vectors of the current SGOP are used as follows:

$$v_f(0,k) = \{k \cdot v_f(0,1), \quad (14)$$
$$k/(k-1) \cdot v_f(0, k-1)\}$$

2) Backward Motion Vector (BMV)

Since a backward motion vector is derived by a non-causal estimation, a motion estimation is carried out in the order reverse to the input order after a future reference picture which may be a $P_M$-picture or an $I_M$-picture is inputted.

In Case of K=M−1

Since the backward motion vector is initially estimated in the SGOP, only a forward motion vector is used as follows:

$$\text{Initial } v_b(M, M-1) = \{-1/(M-1) \cdot v_f(0, M-1), \quad (15)$$
$$-v_f(0,1),$$
$$(0,0)\}$$

In Case of $2 \leq k \leq M-2$

Forward and backward motion vectors already estimated in the current SGOP can be used as follows:

$$v_b(M,k) = \{(M-k) \cdot v_b(M, M-1), \quad (16)$$
$$-(M-k)/(M-k-1) \cdot v_b(M, k+1),$$
$$-(M-k)/k \cdot v_f(0,k)\}$$

Where the value of M is 2 in the equations (13) to (16), two candidate motion vectors have the same value. In this case, accordingly, the number of candidate motion vectors for the initial motion vector is reduced by one.

Where a block has a moving edge, it is impossible to estimate a suitable initial motion vector only by motion vectors of the past picture positioned at the same block position. In this case, an accurate initial motion vector estimation can be possible, as compared to the case utilizing motion vectors of causal blocks. This can be understood by referring to FIG. 7.

Figure 7:
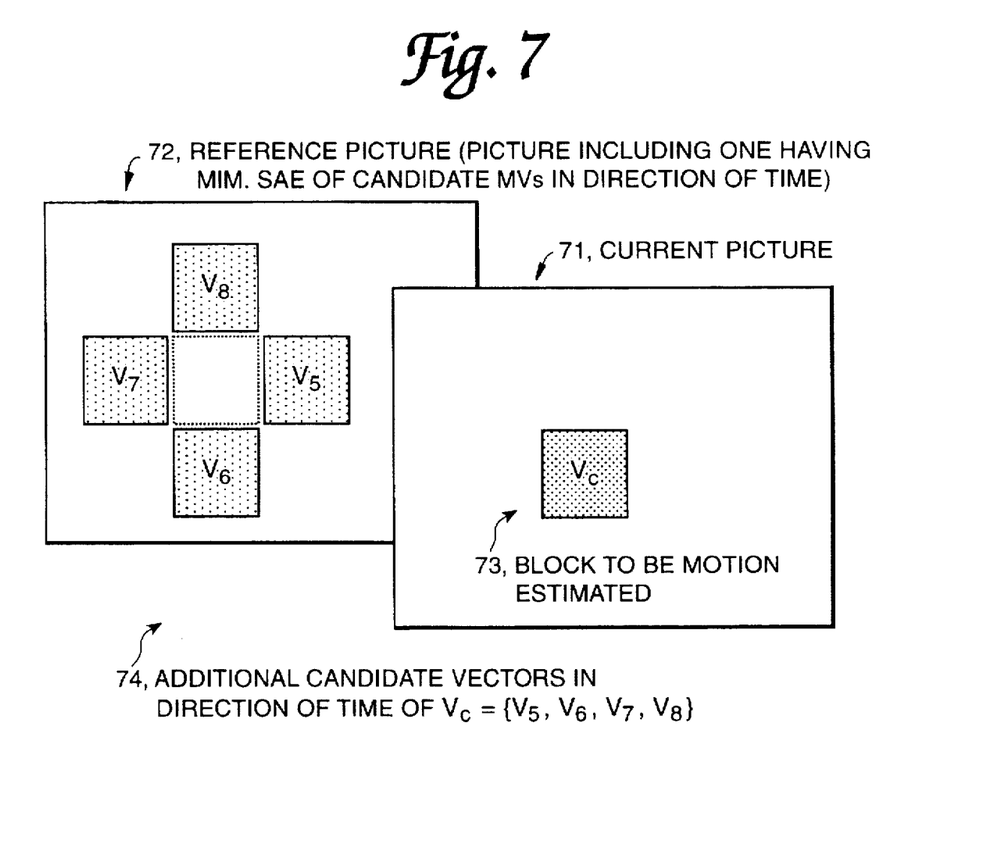
FIG. 7 is a schematic view illustrating additional candidate vectors in a time area.

In accordance with the algorithm of the present invention, four motion vectors $v_5$, $v_6$, $v_7$ and $v_8$ respectively positioned at right, left, lower and upper positions are used taking into consideration the correlation of motion vectors.

From the above-mentioned equations, the procedure of estimating the initial motion vector in accordance with the algorithm of the present invention can be described as involving the following steps:

Step 1: Determination of Candidate Motion Vectors in Direction of Time

Among two or three candidate motion vectors derived from one of the equations (13) to (16) for each picture in the SGOP, one involving the minimum sum of estimated absolute errors (SAE) is selected.

Step 2: Determination of Candidate Motion Vectors in Direction of Space

Among three candidate motion vectors of blocks neighboring in the direction of space as shown in FIG. 6 and candidate motion vectors determined at the step 1, one involving the minimum sum of estimated absolute errors is selected.

Step 3: Determination of Suitability of Candidate Motion Vectors

If the minimum sum of estimated absolute errors is less than $T_1$ (Min. SAE<T1), the motion vector derived in the above procedure is determined as the final initial motion vector.

If not, four candidate motion vectors $v_4$, $v_5$, $v_6$ and $v_7$ shown in FIG. 7 are compared with one another in terms of the sum of estimated absolute errors. On the basis of the result of the comparison, the final initial motion vector is determined.

(2) Selection of Search Area

The size of search area is determined depending on the accuracy of the estimated initial motion vector. In accordance with the full search algorithm, the search area is increased in proportion to the square of the picture space as expressed in equation (3) because the origin, namely, the vector v (v=(0, 0)) is set as the initial motion vector. In the case of the telescopic search algorithm, a search area corresponding to the picture space of 1 as expressed in equation (4) is always used because the motion vector of the past picture is set as the initial motion vector.

In accordance with the algorithm of the present invention, it is possible to greatly reduce the search area because an initial motion vector is set approximate to an actual motion.

In accordance with the present invention, the search area is variably selected within a range corresponding to one third of the maximum displacement p involved when the picture space is 1, depending on the accuracy of the estimated initial motion vector. A sum of estimated absolute errors is used as the reference factor to determine the accuracy of initial motion vector. The sum of estimated absolute errors of an estimated error motion compensated from the initial motion vector is defined as $INIT_{SAE}$. On the other hand, $MAX_{SAE}$ represents the maximum one of the sums of estimated absolute errors respectively calculated in three blocks neighboring one another in the direction of space and one block selected in the direction of time in the procedure of estimating the initial motion vector. The minimum one of the calculated sums of estimated absolute errors is defined as $MIN_{SAE}$. In this case, the maximum displacement within a search area around the initial motion vector is selected as follows:

---

1) In the case of p = 7 pels/frame
   If $INIT_{SAE} < T_0$,                 p' = 1;
   If $INIT_{SAE} < 1.25 \times MAX_{SAE}$,   p' = 2; and
   If not,                                p' = 3; and -continued 2) In the case of p = 14 pels/frame
If $INIT_{SAB} < T_0$,  p' = 1;
If $INIT_{SAB} < 2 \times MIN_{SAB}$ or
$INIT_{SAB} < 0.7 \times MAX_{SAB}$,  p' = 2;
If $INIT_{SAB} < MAX_{SAB}$,  p' = 3;
If $INIT_{SAB} < 1.25 \times MAX_{SAB}$,  p' = 4; and
If not,  p' = 5

Here, $T_0$ is selected to be the value of $3 \times (16 \times 16)$. Generally, this value $T_0$ is regarded as an effect of noise. Other threshold values are selected through experiments. In particular, the value p' determining the search area is determined irrespective of the space between two pictures to be motion-estimated. Although the selection of the maximum displacement has been described in conjunction with the case of p=7 pels/frame and the case of p=14 pels/frame, the maximum displacement may be determined in a similar manner for other values of p.

(3) Additional Motion Vector Estimation

The final motion vector is estimated within a small search area around the initial motion vector determined in accordance with the present invention, through the block matching algorithm. The number of matched blocks in the search area can be determined as follows:

$$\text{Number of Matched Blocks} = (2p' + 1)^2 \quad (17)$$
$$= \left(2p \cdot \frac{p'}{p} + 1\right)^2$$
$$\approx \left(\frac{p'}{p}\right)^2 \cdot 4P^2$$

As compared to the telescopic search algorithm, accordingly, the computation amount for each block is reduced by about 1/7 time to about 1/49 time in the case of p=7 pels/frame and about 1/7 time to about 1/196 time in the case of p=14 pels/frame.

As apparent from the above description, the high speed block matching algorithm in accordance with the present invention provides advantages of obtaining an estimation efficiency compared to those of the existing full search and telescopic search algorithms and yet realizing a real time processing.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. In a system for compressing and encoding video data representing moving pictures, wherein pictures are logically divided into blocks, a method of bi-directional motion vector estimation for use in block matching in a block-based motion estimation system, the block-based motion estimation system being operable to effect block matching and to generate motion vectors representing the displacement between a new video data block and a displaced video data block within a reference video frame, the method comprising, for a block in the picture:

(a) estimating an initial motion vector for the block;

(b) selecting a search area around the initial motion vector for the block based on an accuracy of the estimated initial motion vector;

(c) selecting a final motion vector in the selected search area; and (d) using the selected final motion vector to compress and encode data representing the pictures wherein the selecting of the search area comprises:

setting the search area based on the value of the sum of estimated absolute errors of the initial motion vector and on the number of picture elements per frame.

where the selecting of the search area is based on the sum of estimated absolute errors of the initial motion vector; the maximum sum of estimated absolute errors of the candidate motion vectors; and the minimum sum of estimated absolute errors of the candidate motion vectors.

2. A method as in claim 1, wherein the estimating of an initial motion vector comprises:

(a1) determining candidate motion vectors in a time direction;

(a2) determining candidate motion vectors in a space direction; and (a3) selecting from the candidate motion vectors determined in (a1) and (a2) the motion vector having a minimum sum of estimated absolute errors.

3. A method as in claim 2, wherein the determining of candidate motion vectors in (a1) comprises:

detecting initial forward motion vector candidates $v_f$ as $$\{-v'_b(M, M-1), 1/(M-1) \cdot v'_f(0, M-1), v'_f(0,1)\}$$

when M, the space between successive pictures is one, and as $$\{k \cdot v_f(0, 1), k/(k-1) \cdot v_f(0, k-1)\}$$

when k, the space between successive pictures is more than one, where $v_f(a, b)$ denotes a motion vector for a macroblock from the a-th picture to the b-th picture in the forward direction, where $v_b(a, b)$ denotes a motion vector for a macroblock from the a-th picture to the b-th picture in the forward direction, and where $v'_f$ and $v'_b$ represent forward and backward motion vectors of a past sub-group of pictures, respectively.

4. A method as in claim 2, wherein the determining of candidate motion vectors in (a1) comprises:

detecting initial backward motion vector candidates $v_b$ as $$\{-1/(M-1) \cdot v_f(0, M-1),$$
$$-v_f(0, 1),$$
$$(0, 0)\}$$

when M, the space between successive pictures, is one, and as $$\{(M-k) \cdot v_b(M, M-1),$$
$$-(M-k)/(M-k-1) \cdot v_b(M, k+1),$$
$$-(M-k)/k \cdot v_f(0, k)\}$$

when k, the space between successive pictures, is more than one, where $v_f(a, b)$ denotes a motion vector for a macroblock from the a-th picture to the b-th picture in the forward direction, where $v_b(a, b)$ denotes a motion vector for a macroblock from the a-th picture to the b-th picture in the forward direction, and where $v_f$ and $v_b$ represent forward and backward motion vectors of a past sub-group of pictures, respectively.

5. A method as in claim 2, wherein the estimating of an initial motion vector further comprises:

(a4) comparing the minimum sum of estimated absolute errors of the selected motion vector with a first threshold, and (a5) based on the comparing, when the minimum sum of estimated absolute errors is less than the threshold, setting the selected motion vector to be the final motion vector, otherwise (a6) determining candidate four motion vectors, one motion vector for each of the blocks immediately to the top, bottom, left and right of the current block, respectively, and then (a7) selecting from the four candidate motion vectors determined in (a6) a motion vector having a minimum sum of estimated absolute errors.

6. A method as in claim 1, further comprising:

calculating as $INIT_{SAE}$ the sum of estimated absolute errors of the initial motion vector;

calculating as $MAX_{SAE}$ the maximum sum of estimated absolute errors of the candidate motion vectors;

calculating as $MIN_{SAE}$ the minimum sum of estimated absolute errors of the candidate motion vectors;

selecting the maximum displacement p' within a search area around the initial motion vector as, when the maximum displacement p is 7 pels/frame:

$p'=1$ when $INIT_{SAE} < T_0$;

$p'=2$ when $INIT_{SAE} < 1.25 \times MAX_{SAE}$;

otherwise $p'=3$; and when the maximum displacement p is 14 pels/frame:

$p'=1$ when $INIT_{SAE} < T_0$;

$p'=2$ when $INIT_{SAE} < 2 \times MIN_{SAE}$ or when $INIT_{SAE} < 0.7 \times MAX_{SAE}$;

$p'=3$ when $INIT_{SAE} < MAX_{SAE}$;

$p'=4$ when $INIT_{SAE} < 1.25 \times MAX_{SAE}$; and otherwise $p'=5$;

where $T_0$ is 768.

* * * * *